United States Patent [19]

Cummings

[11] Patent Number: 4,727,766

[45] Date of Patent: Mar. 1, 1988

[54] HEAT REGULATING MECHANISM FOR AUTOMOTIVE HEATING AND AIR CONDITIONING SYSTEMS

[75] Inventor: John G. Cummings, Cary, Ill.

[73] Assignee: Indak Manufacturing Corp., Northbrook, Ill.

[21] Appl. No.: 14,937

[22] Filed: Feb. 13, 1987

Related U.S. Application Data

[62] Division of Ser. No. 870,438, Jun. 4, 1986, Pat. No. 4,667,068.

[51] Int. Cl.⁴ .......................... G05G 7/10; B60H 1/00
[52] U.S. Cl. ..................................... 74/491; 74/99 R; 74/501 A; 98/2.08; 137/353; 165/25
[58] Field of Search ................... 74/99 R, 491, 501 A; 98/2.05, 2.08; 165/24, 25; 137/353; 236/51

[56] References Cited

U.S. PATENT DOCUMENTS

| 4,271,897 | 6/1981 | Tatemoto ........................... 165/25 X |
| 4,427,056 | 1/1984 | Johnson et al. ........................ 165/42 |

FOREIGN PATENT DOCUMENTS

| 2361696 | 6/1975 | Fed. Rep. of Germany ........ 165/25 |
| 2519213 | 11/1975 | Fed. Rep. of Germany ... 74/501 A |
| 2721497 | 11/1977 | Fed. Rep. of Germany ....... 98/2.05 |
| 2805517 | 8/1978 | Fed. Rep. of Germany ....... 98/2.05 |
| 3001515 | 7/1980 | Fed. Rep. of Germany ....... 98/2.05 |

Primary Examiner—Allan D. Herrmann
Attorney, Agent, or Firm—Burmeister, York, Palmatier, Hamby & Jones

[57] ABSTRACT

The mechanism comprises a heat control knob, pivotally mounted on the front end of an operating lever which is pivotally and slidably supported by second pivot means, having its pivot axis parallel with but spaced from the axis of the first pivot means. The front portion of the operating lever has a follower which is guided by a guide track, so that the heat control knob is movable along a straight path. The operating lever has a pivot slot which is pivotally and slidably guided by the second pivot means. The operating lever also has a generally longitudinal coupling slot which receives a coupling pin projecting from a control lever, pivotally supported for swinging movement about the axis of the first pivot means. The pivot slot and the coupling slot in the operating lever are curved in shape and preferably have opposite directions of curvature, to achieve a desirable coupling relationship between the operating lever and the control lever, which is adapted to operate heat control components, such as a heat control valve.

7 Claims, 26 Drawing Figures

HEAT REGULATING MECHANISM FOR AUTOMOTIVE HEATING AND AIR CONDITIONING SYSTEMS

This application is a division of application Ser. No. 870,438, filed June 4, 1986, now U.S. Pat. No. 4,667,068, issued May 19, 1987.

FIELD OF THE INVENTION

This invention relates to control mechanisms for automotive heating and air conditioning systems. In some cases, such systems include both heating and air conditioning. In other systems, only heating is provided. All such systems are sometimes referred to generically herein as automotive air environment regulating systems. There is a considerable diversity in the complexity of such systems, and a corresponding diversity in the complexity of the control mechanisms or devices for such systems. Such control mechanisms or devices include electrical switches, vacuum switches or valves, and mechanical control devices.

BACKGROUND OF THE INVENTION

Virtually all automotive vehicles are provided with automotive air environment regulating systems, which almost always include heating systems, and also often include air conditioning systems. Virtually all such systems include a blower, driven by an electric motor, for circulating the air which is to be heated or cooled. Some systems include more than one blower. The amount of heat is generally regulated by a heat control valve which regulates the supply of hot liquid coolant from the engine to a heat exchanger which heats the air.

Most air conditioning systems are activated and deactivated by an electrically operable air conditioning clutch which is connected between an engine-driven pulley and an air conditioning compressor. The amount of cooled or heated air is usually controlled by changing the speed of the blower motor.

Typically, such systems include duct work containing movable doors or diverters for directing air into the passenger cabin through high or low outlets, and through windshield outlets which direct air against the windshield for defogging and defrosting purposes. Such doors or diverters are often operated by vacuum motors which selectively receive their motive power from the engine vacuum.

The present invention relates to control mechanisms for such systems. Such control mechanisms are generally of the type comprising three manually operable controls, including a manually movable selector control member, a manually movable heat control member, and a manually movable blower switch control member which operates the blower speed control switch.

The selector control is employed to select the function or functions to be performed by the system. For different systems, the selector control may have different numbers of positions, accordihg to the complexity of the system. Thus, for example, a complex system may require seven positions to select seven functions, including OFF, MAXIMUM AIR CONDITIONING, NORMAL AIR CONDITIONING, BI-LEVEL AIR CONDITIONING, VENTILATION, HEAT, and DEFROST. For a less complicated system, the selector control may have five positions to select five functions, including OFF, AIR CONDITIONING, HEAT, HEAT WITH DEFROST, and DEFROST, for example. In a system without air conditioning, the selector control may select the five functions of OFF, VENTILATION, BI-LEVEL, HEAT and DEFROST, for example.

To select the various functions, the selector control member generally operates electrical switches, vacuum switches, or both, often combined into a single unit referred to as a vacuum-electric switch. Whatever the number of function positions, it is desirable to provide detent means for detaining the selector control in each of its function selecting positions.

The heat control mechanism may include a heat control knob, pivotally connected to the front end of an operating lever, which is also pivotally and slidably movable, so that the heat control knob is movable along a substantially straight path, parallel with the path of the selector knob.

One object or accomplishment of the present invention is to provide a new and improved heat control mechanism, in which the operating lever is pivotally and slidably movable relative to second pivot means, having a pivot axis parallel with but substantially spaced from the first pivot axis, such operating lever having an operating connection to a control lever which is swingable about the first axis. The control lever is adapted to be connected to the heat control valve, by a sliding wire-type control cable, or other suitable means. This heat control mechanism avoids the complexity of utilizing the same pivot axis for both the operating lever and the control lever of the heat control mechanism, as well as the selector lever for the function selector mechanism.

SUMMARY OF THE INVENTION

In accordance with the present invention, the object may be accomplished by providing a heat regulating mechanism for auotmotive air environment regulating systems, such heat regulating mechanism comprising a control lever having means for connecting such control lever to a heat control device, first pivot means for pivotally supporting such control lever for swinging movement about a first pivot axis, a manually operable operating lever having an end portion with manually engageable means thereon movable along a predetermined path, such operating lever having a second portion with a generally longitudinal guide slot therein, second pivot means extending through such guide slot and supporting such second portion of such operating lever for a combination of pivotal and sliding movement, such second pivot means being disposed along a second pivot axis which is parallel with but spaced from first pivot axis, a stationary guide track near the end portion of the operating lever, such operating lever having a follower thereon for slidably engaging and following the guide track, and pin and slot elements forming an operative connection between such operating lever and such control lever, such pin element being on one of such levers while such slot element is on the other of such levers, whereby manual movement of such operating lever causes swinging movement of such control lever with a combination of swinging and sliding movements between such pin and slot elements.

Preferably, the pin element is provided on the control lever, while the slot element is formed in the operating lever. The slot element is generally longitudinal, relative to the operating lever, but is preferably curved in shape to affect the control relationship between the operating lever and the control lever.

The longitudinal guide slot is also preferably curved in shape, to affect the control relationship between the operating lever and the control lever.

The slot element and the longitudinal guide slot preferably have opposite directions of curvature, to provide a particularly desirable control relationship between the operating lever and the control lever.

In the disclosed embodiment, the control lever has a plate portion with a clearance slot for receiving the second pivot means with a clearance fit. A control cam element is formed on plate position, for operating a separate vacuum switch in one position, usually the OFF position of the heat control level.

BRIEF DESCRIPTION OF THE DRAWINGS

Further objects, advantages and features of the present invention will be disclosed in the following description of illustrative embodiments of the present invention, such embodiments being illustrated in the accompanying drawings, in which.

DETAILED DESCRIPTION OF ILLUSTRATIVE EMBODIMENTS

Figure 1:
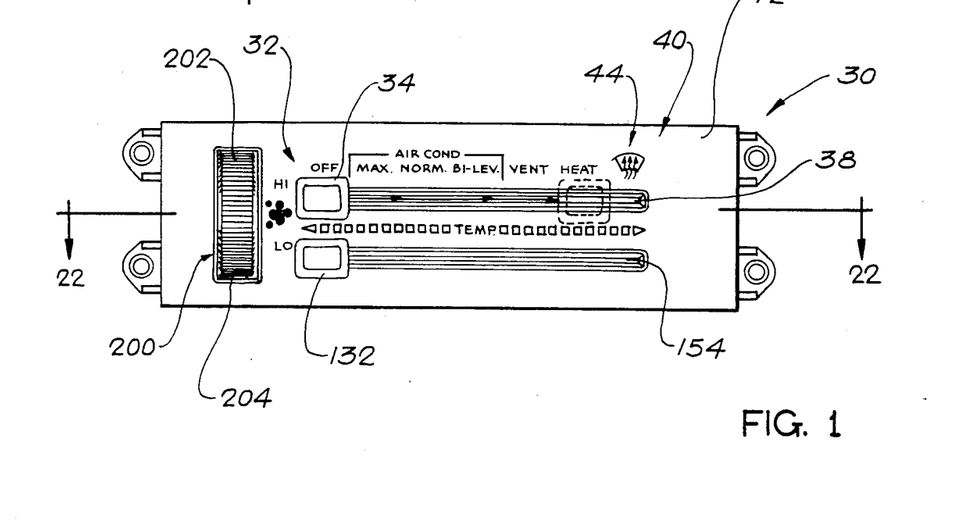
FIG. 1 is a front view of a control mechanism for an automotive heating and air conditioning system, such mechanism being an illustrative embodiment of the present invention.
Figure 2:
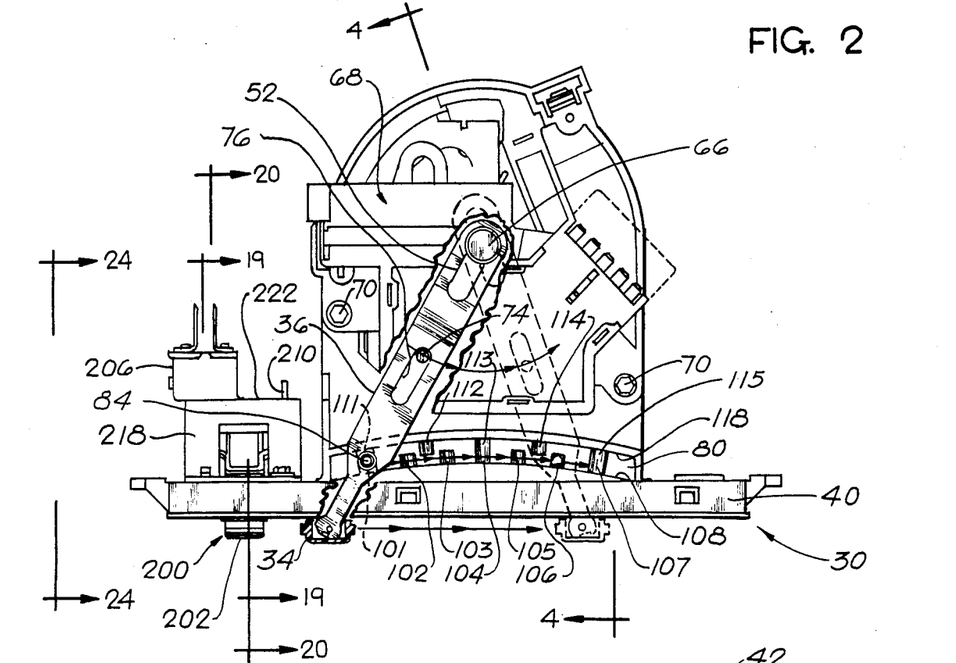
FIG. 2 is a plan view of the control mechanism of FIG. 1, with certain portions broken away and shown in section.
Figure 3:
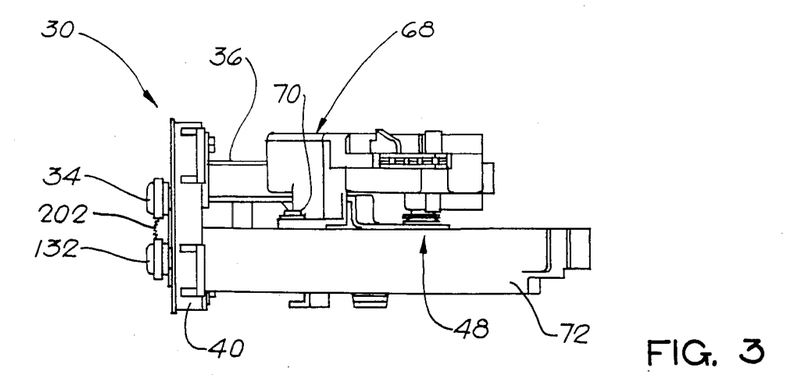
FIG. 3 is a side elevational view of the control mechanism of FIG. 1.

FIGS. 1-3 illustrate a combined control unit or mechanism 30 for an automotive heating and air conditioning system. The present invention is also applicable to control mechanisms for automotive heating systems which do not include air conditioning. Such systems, with or without air conditioning, may be referred to generically as automotive air environment regulating systems.

The combined control mechanism 30 comprises a function selector control member 32, illustrated as including a manually operable knob 34, pivotally connected to the front end of a function selector control lever 36, extending through a horizontal slot 38 in a front panel assembly 40. The knob 34 is movable along a substantially straight path in front of the front surface member 42 of the front panel assembly 40. In this case, the knob 34 is movable to a series of seven function selecting positions. The first position is labelled OFF. The next three positions are utilized for the control of air conditioning and are bracketed with a label which reads AIR COND. The individual positions are labelled MAX, meaning maximum; NORM, meaning normal; and BI-LEV, meaning bi-level, in that the cooled air is to be directed through both the high and low outlets. The fifth position is labelled VENT, standing for ventilation. The sixth position is labelled HEAT. Finally, the seventh position is marked with a standard defrost symbol 44, indicating that the position is used to select a windshield defrosting function.

Figure 4:
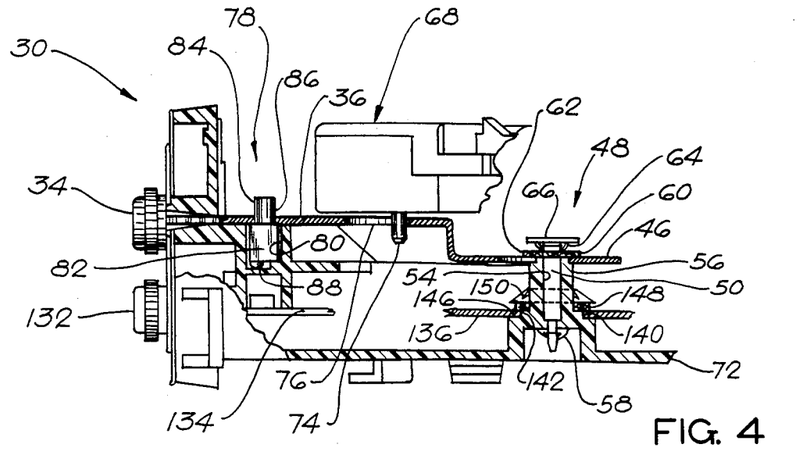
FIG. 4 is a fragmentary elevational section, taken generally along the line 4—4 in FIG. 2, and showing the reversible detent carriage in one of its two positions.

It will be understood that the manually operable control member 32 includes both the knob 34 and the lever 36. As shown in FIGS. 2 and 4, the control lever 36 has a rear end portion 46 which is pivotally and slidably supported by pivot means 48, including a pivot pin 50 which extends through a longitudinal pivot slot 52 in such rear end portion 46. The pivot pin 50 is received by a central opening 54 in a stationary cylindrical supporting post 56. The pin 50 is suitably anchored, as by a retainer spring 58. As shown, the cylindrical post 56 has a reduced cylindrical end portion 60 which is pivotally and slidably received in the pivot slot 52, formed in the rear portion 46 of the lever 36. The rear lever portion 46 is retained against the post 56 by a friction washer 62 and a spring washer 64, received on the pin 50 and sandwiched between the rear lever portion 46 and a head 66 on the pin 50. The slidable mounting of the rear lever portion 46 enables the selector knob 34 to travel along a substantially straight line path.

The control lever 36 operates a function selector switch 68, which may include electrical switching components, vacuum switching components, or both. The illustrated switch 68 includes an assembly of electrical and vacuum switching components and may be referred to as a vacuum-electrical switch, which may be of any known or suitable construction. The selector switch 68 is adapted to control the air conditioning clutch, the blower motor, and the various vacuum motors which operate the doors or diverters in the air ducts of the heating and ventilating system.

The function control switch 68 is a separate assembly, which is suitably mounted, as by means of screws 70, on a supporting base 72. As shown, the pivot post 56 is molded in one piece with the base 72, using a suitable resinous plastic material. The provision of a separate function selector control switch makes it possible to produce different control units by mounting different control switches on the supporting base 72.

The control unit or mechanism 30 includes means forming an operating connection between the control lever 36 and the function control switch 68, such means being illustrated as including a pin 74 and a slot 76, in which the pin is slidably received. As shown, the slot 76 is formed in the control lever 36, while the pin 74 projects from the function control switch 68 and is the movable operating component thereof. The operating connection formed by the pin 74 and the slot 76 accommodates the longitudinal sliding movement of the control lever 36.

The control unit 30 includes a convertible detent mechanism 78 which detains the control lever 36 in its various function selecting positions, and is also effective to guide the control lever 36 in such a manner that the selector knob 34 is movable along a substantially straight path. Such convertible detent mechanism 78 includes a guide formation, illustrated as a guide channel 80 which is molded in one piece with the supporting base 72, but may be otherwise formed. As shown, the guide channel 80 is located just behind the front panel 40 and extends along the path of movement of the control lever 36. The guide channel 80 is given a curved shape, so as to cause the function selector knob 34 to travel along a substantially straight path.

The guide formation or channel 80 is adapted to be followed by a reversible detent carriage or block 82, reversibly received in the guide channel 80 and slidable therealong. The detent carriage 82 has a pivotal connection to the control lever 36, afforded by a portion formed as a pivot pin 84, projecting from the detent carriage 82 and pivotally received in a circular opening 86, formed in the control lever 36. It will be evident that the detent carriage 82 follows the curved detent channel 80 and causes longitudinal sliding movement of the control lever 36, so that the function selector knob 34 travels along a substantially straight path.

Figure 5:
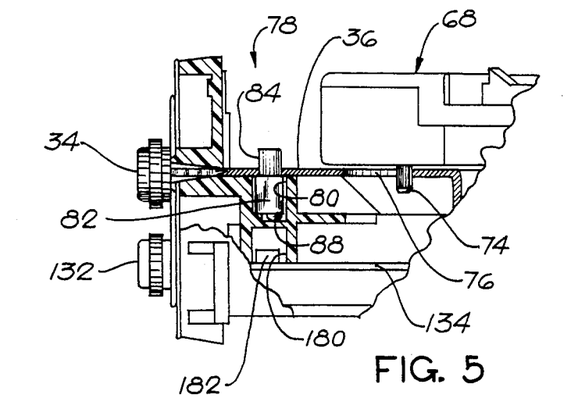
FIG. 5 is a fragmentary elevational section, similar to FIG. 4, but showing the reversible detent carriage in the other of its two positions, the view being taken generally along the line 5—5 in FIG. 6.

As shown in FIGS. 4 and 5, and also in the enlarged views of FIGS. 7-12, the reversible detent carriage or block 82 is provided with a detent member, illustrated as a detent ball 88, which is offset toward one side 90 of the detent carriage 82. As shown, the detent ball 88 is movably received in an opening or recess 92 and is biased outwardly by a spring 94, compressed in the recess 92 between the detent carriage 82 and the detent ball 88. The spring 94 is. illustrated as a coil spring. The detent ball 88 is retained in the opening 92 by a lip 96, formed on the detent carriage 82. The opening or recess 92 has an open side on the side 90 of the detent carriage 82, so that it is easy to insert the detent ball 88 and the spring 94 into the opening or recess 92.

Figure 6:
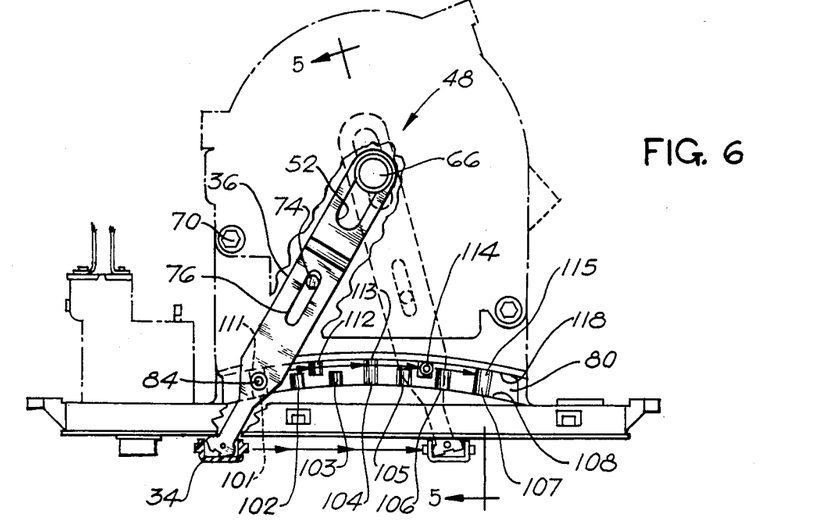
FIG. 6 is a somewhat diagrammatic plan view, similar to FIG. 2, but showing the detent carriage reversed, to provide five detent positions, rather than seven detent positions, as in FIG. 2.

As shown to best advantage in FIGS. 2 and 6, the guide formation or channel 80 is formed with first and second sets of detent elements, illustrated as detent recesses, distributed in first and second sequences along first and second opposite sides of the guide channel. In this case, the first and second sets of detent elements take the form of detent recesses, formed in the bottom of the guide channel 80, along the front and rear sides thereof. Thus, there are seven detent recesses 101, 102, 103, 104, 105, 106 and 107, formed in the bottom portion of the channel 80, along the front side 108 thereof. There are five detent recesses 111, 112, 113, 114 and 115, formed in the bottom portion of the guide channel 80, toward the rear side 118 thereof.

The number and arrangement of the two sets of detent recesses can be varied. In this case, some of the detent recesses of the two sets are aligned, so that they merge, to extend between the front and rear sides 108 and 118 of the guide channel 80. This is true of the detent recesses 101 and 111; the detent recesses 104 and 113; and the detent recesses 107 and 115.

FIGS. 4 and 5 represent the two different positions of the reversible detent carriage 82. In FIG. 4, the detent member or ball 88 is offset toward the front of the guide channel 80, so that the detent ball encounters and is detained by the first set of recesses, comprising the seven recesses 101-107. In FIG. 5, the detent carriage 82 is reversed, so that the detent ball 88 is offset toward the rear side of the guide channel 80, whereby the detent ball 88 encounters and is detained by the second set of detent recesses, comprising the five recesses 111-115.

Figures 7, 8, 9, 10, 11, 12:
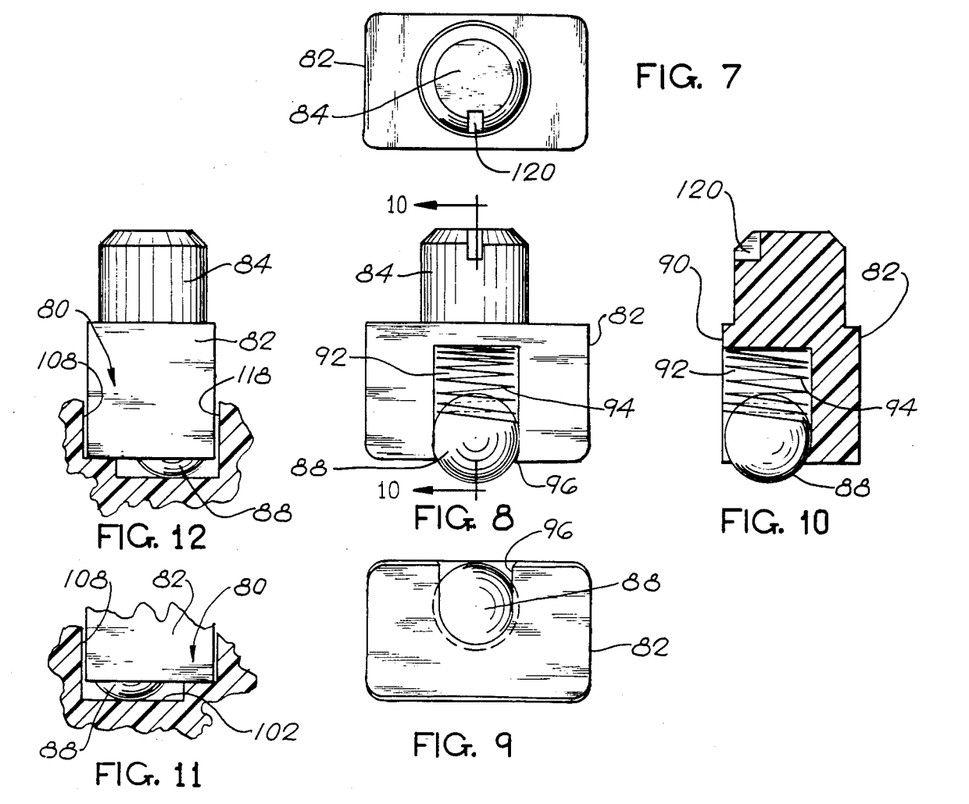
FIG. 7 is an enlarged plan view of the detent carriage.
FIG. 8 is an enlarged elevational view of the detent carriage.
FIG. 9 is an enlarged bottom plan view of the detent carriage.
FIG. 10 is a sectional view, taken generally along the line 10—10 in FIG. 8.
FIGS. 11 and 12 are enlarged fragmentary sections, showing the reversible detent carriage in its two different positions, relative to the detent guide channel, the views being somewhat similar to portions of FIGS. 4 and 5.
Figures 13, 14, 15:
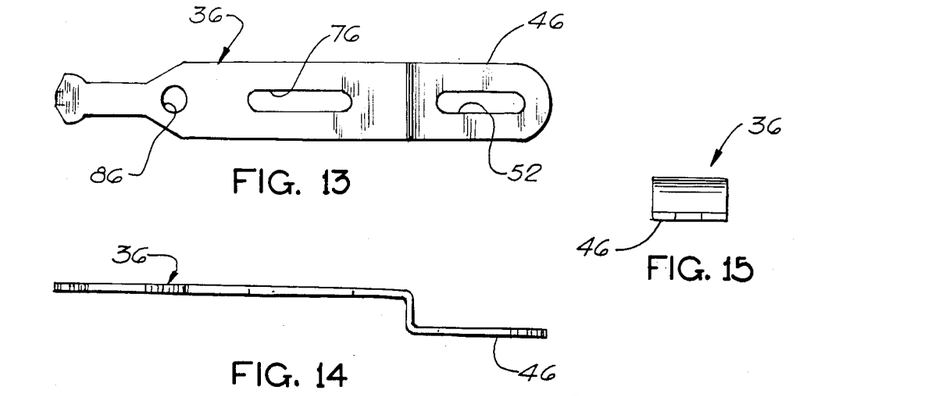
FIGS. 13, 14 and 15 are plan, side and end views of the function selector operating lever, as shown in FIG. 2.

Similarly, FIGS. 11 and 12 represent the two different positions of the reversible detent carriage 82. In FIG. 11, the detent member 88 is offset toward the front side 108 of the channel 80, so that the detent ball 88 encounters the seven detent recesses 101-107 of the first set. In FIG. 12, the detent carriage 82 is reversed, with the detent ball 88 offset toward the rear side 118 of the guide channel 80, so that the detent ball 88 encounters the five detent recesses 111-115.

As shown in FIGS. 7, 8 and 10, it is advantageous to form a mark, such as the illustrated notch 120, on one side of the pivot pin 84 on the reversible carriage 82, to indicate the position of the reversible carriage. The illustrated notch 120 is aligned with the offset detent ball 88. The notch 120 is of assistance in correctly positioning the reversible detent carriage in the guide channel 80, when the reversible detent mechanism 78 is being assembled.

Figure 25:
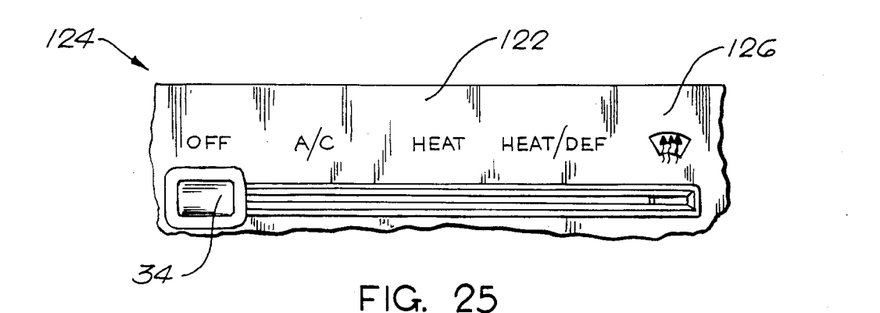
FIG. 25 is a fragmentary front elevation, similar to a portion of FIG. 1, but showing a modified function selector control mechanism.

FIG. 25 illustrates a modified front panel 122 for a modified control unit 124, in which the function selector control knob 34 has only five positions, instead of seven, for use with a function selector switch having only five positions. On the front panel 122 of the modified control unit 124, the five positions are labelled OFF; A/C, meaning air conditioning; HEAT; HEAT/-

DEF, standing for a combination of heating and windshield defrosting functions; and a standard symbol 126, representing a windshield defrosting function.

For the control unit 124 of FIG. 25, the convertible detent mechanism 78 is assembled to provide the five detent positions 111–115, as previously explained. FIG. 25 illustrates the fact that all components of the convertible detent mechanism 78 can be used with function control switches having either seven or five positions. In this way, production economies can be achieved.

As shown in FIGS. 1, 16, 17 and 18, the control unit 30 comprises a heat regulating mechanism 130, including a manually operable heat control knob 132 which is movable along the front panel surface 42, generally parallel with the function control knob 34. The knob 132 is movable from left to right to increase the heat from low to high. The heat regulating mechanism 130 is adapted to operate a heat control valve or the like, which regulates the supply of hot liquid coolant from the automotive engine to a heat exchanger, for heating the air to be circulated by the automotive heating and air conditioning system. The heat regulating mechanism 130 is adapted to be connected to the heat control valve by means of a sliding wire type control cable or the like.

Figure 16:
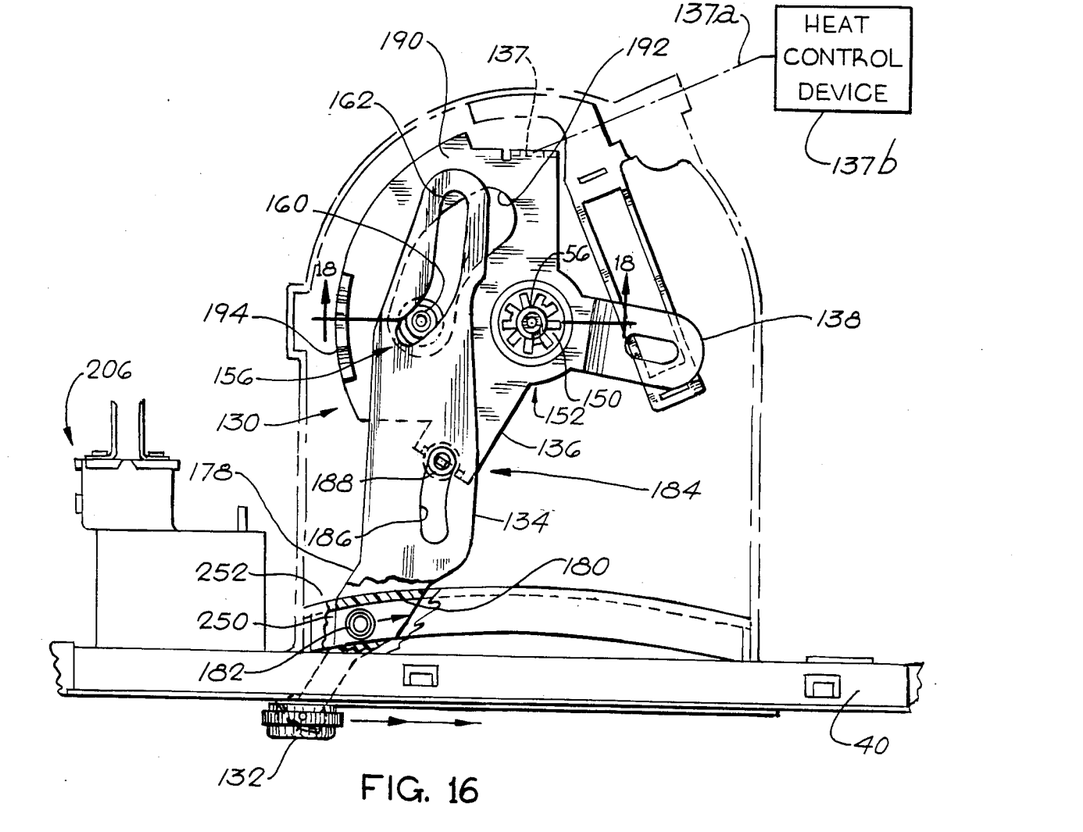
FIG. 16 is a somewhat diagrammatic plan view, with parts removed, and with portions in section, to show the heat control mechanism of the embodiment of FIG. 1, the operating lever being shown in its extreme left-hand or OFF position.

The heat regulating mechanism 130 includes an operating lever 134 which in turn operates a control lever 136 having a downwardly projecting ear or arm 137, adapted to be connected to a typical sliding wire type control cable, 137a which extends to a typical heat control valve or device 137b, illustrated diagrammatically in FIG. 16 by a box labeled HEAT CONTROL DEVICE. The lever 136 also has a slotted radial arm 138, adapted to operate a heat control potentiometer.

The control lever 136 is swingable about the pivot axis of the previously mentioned pivot post 56. Specifically, as shown in FIG. 4, the post 56 has an enlarged circular portion 140, adapted to be pivotally received in a circular opening 142, formed in the control lever 136. Around the opening 142, the control lever 136 slidably engages an annular shoulder 146, formed on the post 56, below the enlarged circular portion 140. The control lever 136 is captivated against the shoulder 146 by a friction washer 148 and a spring retainer washer 150, both mounted around the post 56. The elements 140–150 act as pivot means 152 for the control lever 136. The pivot axis of such pivot means 152 coincides with the pivot axis of the pivot means 48 for the function control lever 36.

The heat control knob 132 is pivotally connected to the front end of the operating lever 134, which is swingably and slidably received in a horizontal slot 154, formed in the front panel assembly 40. The operating lever 134 is slidable longitudinally, as well as being swingable laterally, in order that the heat control knob 132 may travel along a straight path, in front of the front panel assembly 40.

Figure 17:
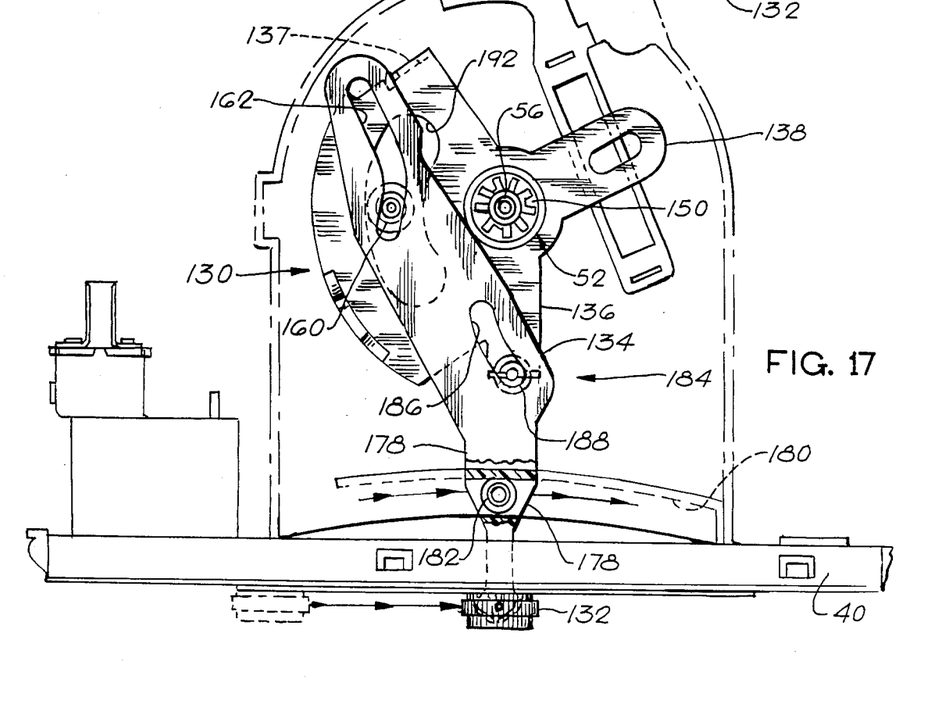
FIG. 17 is a view similar to FIG. 16, but showing the heat control operating lever in an intermediate position.
Figure 17A:
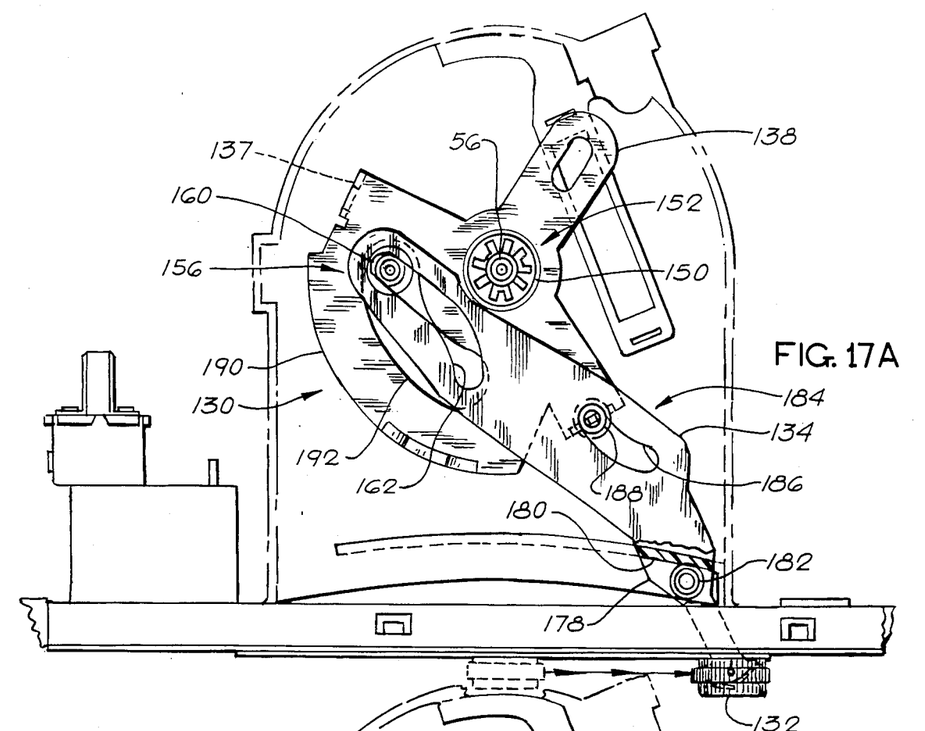
FIG. 17A is a view similar to FIG. 16, but showing the heat control operating lever in its extreme right-hand position, used for maximum heat.
Figure 18:
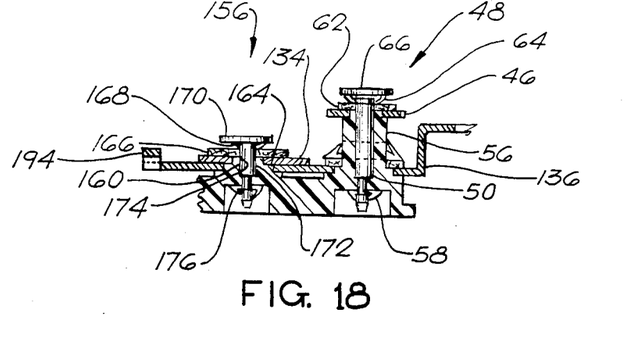
FIG. 18 is a fragmentary section, showing the first and second pivot means, the view being taken generally along the line 18—18 in FIG. 16.
Figure 19:
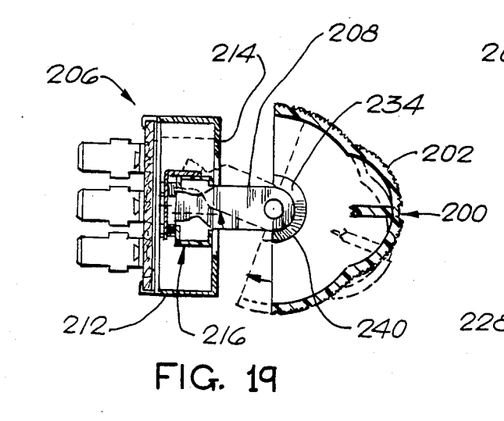
FIG. 19 is a somewhat diagrammatic sectional view, taken generally along the broken line 19—19 in FIG. 2, and showing the blower speed control switch and its operating lever.
Figure 20:
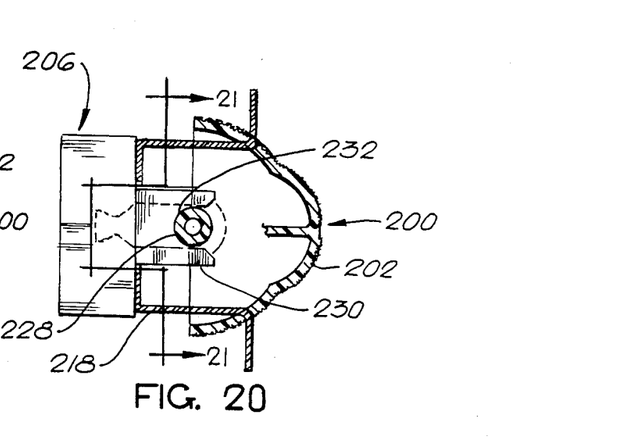
FIG. 20 is a somewhat diagrammatic elevational section, taken generally along the broken line 20—20 in FIG. 2.
Figure 21:
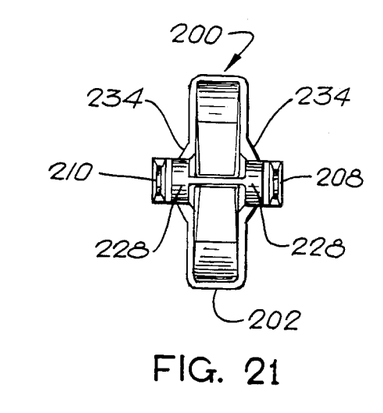
FIG. 21 is a rear elevational view of the blower speed control operating lever or thumbwheel, the view being taken as indicated by the line 21—21 in FIG. 20.

As shown by FIGS. 16–18, the operating lever 134 is pivotally and slidably supported by additional pivot means 156 having a pivot axis which is parallel with but spaced from the pivot axis of the pivot means 152 for the heat control lever 136. The provision of the additional pivot means 156 avoids the complication of pivotally and slidably supporting the operating lever 134 about the same pivot axis, already used by the pivot means 48, for the function control lever 36, and the pivot means 152, for the heat control lever 136.

As illustrated in FIGS. 16 and 18, the additional pivot means 156 may comprise a cylindrical pivot post 160 which may be molded in one piece with the base 72. The pivot post 160 is pivotally and slidably received in a generally longitudinal slot 162, formed in the operating lever 134. The post 160 is formed with an annular shoulder 164, against which the operating lever 134 is lightly pressed by a friction washer 166 and a spring washer 168, retained by the head 170 of a pivot pin 172. It will be seen that the pivot pin 172 extends through a central opening 174 in the post 160 and is retained by a spring retaining washer 176.

The operating lever 134 has a front portion 178 which is guided by a guide track, illustrated in the form of a guide channel 180, molded in one piece with the base 72. The operating lever 134 carries a follower 182, slidably received in the channel 180 and adapted to be guided along the path established by such channel. The follower 182 is shown as a cylindrical post or projection, formed from the metal of the operating lever 134. It will be seen that the channel 180 is curved in such a manner that the heat control knob 132 is caused to move along a substantially straight path, as the operating lever 134 is swung between its extremes of movement, as shown in FIGS. 16 and 17A.

An operating connection 184 is provided between the operating lever 134 and the control lever 136. The operating connection 184 is preferably of the pin and slot type, illustrated as comprising a generally longitudinal slot 186 in the operating lever 134, and a pin member 188, carried by the control lever 136.

As the operating lever 134 is swung between its extreme positions, as illustrated in FIGS. 16, 17 and 17A, there is a combination of pivotal and sliding movement between the pivot post 160 and the pivot slot 162 in the lever 134. Similarly, there is a combination of pivotal and sliding movement between the operating slot 186 and the follower pin member 188. The swinging movement of the operating lever 134 causes swinging movement of the control lever 136, between its extremes of movement, as shown in FIGS. 16 and 17A.

To establish a desirable operating relationship between the operating lever 134 and the control lever 136, the slots 162 and 186 are preferably curved in shape, as illustrated in FIGS. 16, 17 and 17A. Preferably, the two slots 162 and 186 have opposite directions of curvature. The operating relationship between the levers 134 and 136 can be changed by changing the curvature of the slots 162 and 186.

The curvature of the slots 162 and 186 compensates for the fact that the pivot axis of the pivot means 156 for the operating lever 134 is offset laterally relative to the pivot axis of the pivot means 152 for the control lever 136, so that the desired operating relationship is achieved between the levers 134 and 136.

The illustrated control lever 136 has a plate portion 190 formed with an arcuate clearance slot 192, through which the pivot post 160 extends. The clearance slot 192 is large enough to afford clearance for the post 160.

The plate portion 190 of the control lever 136 may be formed with an upwardly projecting cam 194, struck from the metal of the control lever 136, for operating the separate vacuum switch element in the function selector switch assembly 68, when the heat control knob 132 is in its low or off position, as shown in FIG. 16.

As shown in FIGS. 1 and 19–24, the control unit 30 includes a blower speed control lever 200 having a thumbwheel portion 202 projecting forwardly through a slot 204 in the front panel assembly 40. The thumbwheel portion 202 is swingable between positions labelled LO and HI. One or more intermediate positions may be provided therebetween.

The blower speed control lever is adapted to operate at least one blower speed control switch 206, and provision is made to operate a second similar switch. Thus, the lever 200 has a pair of rearwardly projecting switch operating arms 208 and 210. The lever 200 is separate from the electrical switch 206, but the operating arm 208 is adapted to extend into the switch 206. Thus, the switch 206 has a casing 212 with a forwardly facing access slot 214, through which the arm 208 is adapted to extend into the casing 212, to operate the movable switching carriage 216 in the casing 212, such switching carriage 216 being illustrated diagrammatically in FIG. 19.

The casing 212 of the illustrated switch 206 is secured to a mounting bracket 218 which is adapted to be fastened to the rear side of the front panel assembly 40, as by means of screws 220. A space 222 is provided on the mounting bracket 218 to receive a second blower switch, which is employed in some modified versions of the control unit 30. The operating arm 210 on the lever 200 is adapted to operate the second blower switch.

The separate blower speed control lever 200 is confined and supported between elements on the mounting bracket 218 and on a rear mounting panel 226, preferably molded in one piece with the front panel assembly 40.

The control lever 200 has rearwardly facing generally semicircular rocker shaft means thereon, illustrated as a pair of rocker shaft elements 228, adapted to be received by forwardly projecting bearing means, illustrated as a pair of bearing flanges 230 on the switch mounting bracket 218. The bearing flanges provide bearing recess means in the form of forwardly facing semicircular bearing recesses 232, formed in the bearing flanges 230, and adapted to receive the rocker shaft elements 228.

Figure 22:
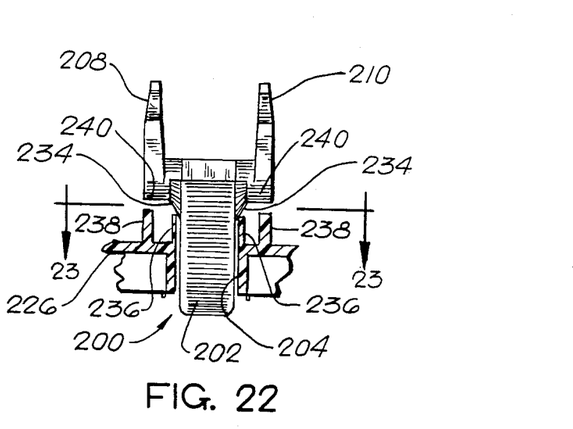
FIG. 22 is a fragmentary view, partly in section along the line 22—22 in FIG. 1, and showing the relationship between the blower speed control operating lever and the front mounting panel.
Figure 23:
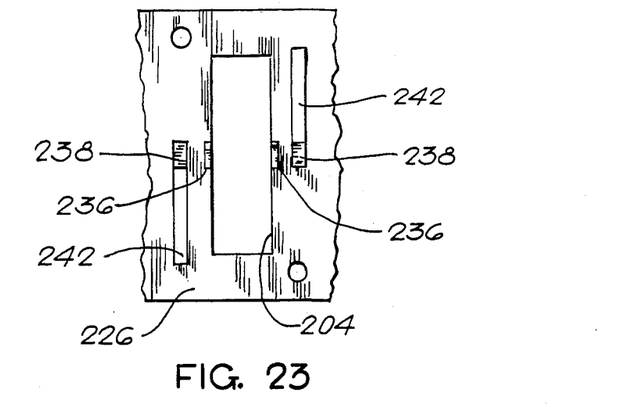
FIG. 23 is a fragmentary elevation, taken as indicated by the line 23—23 in FIG. 22, and showing the rear side of the front mounting panel, where the blower speed control switch is mounted.
Figure 24:
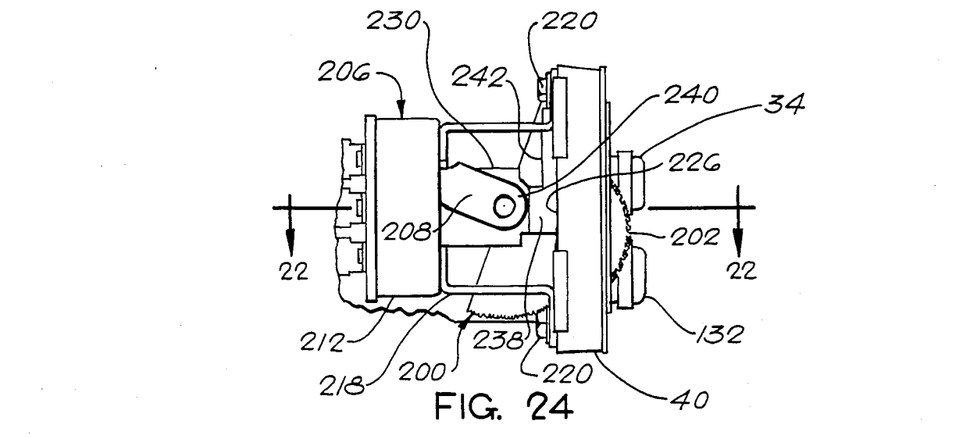
FIG. 24 is a fragmentary side elevation, taken generally as indicated by the line 24—24 in FIG. 2, and showing the blower speed control switch and its operating lever or thumbwheel.

The operating lever 200 has a pair of forwardly facing tapered shaft elements 234 having generally frustoconical curvature. Such tapered shaft elements 234 are engaged and confined by a pair of rearwardly projecting flexible flanges 236 on the mounting panel 226, the thin flexible flanges 236 preferably being molded in one piece with the panel 226. The engagement between the tapered shaft elements 234 and the flexible flanges 236 is shown in FIG. 22. Such engagement causes outward lateral flexure of the thin flanges 236 by the tapered shaft elements 234, so that the flexible resilient flanges 236 have a spring action, adapted to push the lever 200 rearwardly, so that the rocker shaft elements 228 are resiliently pressed against the semicircular bearing recesses 232 in the bearing flanges 230. This spring action prevents any rattling of the blower speed control lever 200.

The mounting panel 226 is also preferably formed with a pair of rearwardly projecting guard flanges 238 which extend into adjacent relation with additional shaft elements 240, facing forwardly on the lever 200. The guard flanges 238 have an additional retaining action, in that they closely limit any forward movement of the shaft elements 240, to protect the flexible flanges 236 against excessive flexure by the tapered shaft elements 234. The guard flanges 238 are substantially thicker than the thin flexible flanges 236, so that the guard flanges 238 are substantially inflexible.

The front portions of the guard flanges 238 merge into locating keys or ribs 242, projecting rearwardly from the supporting panel 226, such keys 242 being employed to assist in accurately locating the switch mounting bracket 218 on the mounting panel 226.

Referring to FIG. 16, the guide channel 180 is on the bottom of the supporting base 72, and one end of the channel 180 is formed with an opening 250 for inserting the follower 182. There is also a sizable opening 252 in the bottom portion of the supporting base 72, through which the operating lever 134 may be inserted during the assembly of the heat control mechanism 130. This construction greatly facilitates the assembly of the mechanism 130.

I claim:

1. A heat regulating mechanism for automotive air environment regulating systems, such heat regulating mechanism comprising
   a control lever having means for connecting such control lever to a heat control device,
   first pivot means for pivotally supporting such control lever for swinging movement about a first pivot axis,
   a manually operable operating lever having an end portion with manually engageable means thereon movable along a predetermined path,
   such operating lever having a second portion with a generally longitudinal guide slot therein,
   second pivot means extending through such guide slot and supporting such second portion of such operating lever for a combination of pivotal and sliding movement,
   such second pivot means being disposed along a second pivot axis which is parallel with but spaced from such first pivot axis,
   a stationary guide track near the end portion of the operating lever,
   such operating lever having a follower thereon for slidably engaging and following the guide track,
   and pin and slot elements forming an operative connection between such operating lever and such control lever,
   such pin element being on one of such levers while such slot element is on the other of such levers,
   whereby manual movement of such operating lever causes swinging movement of such control lever with a combination of swinging and sliding movements between such pin and slot elements.

2. A mechanism according to claim 1,
   such pin element being on such control lever,
   such slot element being formed in such operating lever for slidably and pivotally receiving such pin element.

3. A mechanism according to claim 2,
   in which such slot element is generally longitudinal relative to such operating lever but is curved in shape to affect the control relationship between such operating lever and such control lever.

4. A mechanism according to claim 3,
   in which such longitudinal guide slot is curved in shape to affect the control relationship between such operating lever and such control lever.

5. A mechanism according to claim 4,
   in which such slot element and such longitudinal guide slot have opposite directions of curvature.

6. A mechanism according to claim 1, in which such control lever includes a plate portion having an arcuate clearance slot for receiving such second pivot means with clearance therebetween, such plate portion having a control cam element thereon.

7. A mechanism according to claim 1, including a supporting base on which such first pivot means and such second pivot means are mounted, such mounting base having an opening for insertion of such operating lever, such guide track having an opening in one end thereof for insertion of such follower.

* * * * *